(12) United States Patent
Niino et al.

(10) Patent No.: US 7,130,127 B2
(45) Date of Patent: Oct. 31, 2006

(54) TERRESTRIAL TELESCOPE WITH DIGITAL CAMERA

(75) Inventors: Masao Niino, Gamagori (JP); Yasunari Oguchi, Gamagori (JP); Shuichi Tominaga, Gamagori (JP)

(73) Assignee: Kowa Co. Ltd. (JP)

( * ) Notice: Subject to any disclaimer, the term of this patent is extended or adjusted under 35 U.S.C. 154(b) by 29 days.

(21) Appl. No.: 10/839,507

(22) Filed: May 5, 2004

(65) Prior Publication Data

US 2004/0233525 A1 Nov. 25, 2004

(30) Foreign Application Priority Data

May 6, 2003 (JP) ............................. 2003-127633

(51) Int. Cl.
  *G02B 27/14* (2006.01)
  *G03B 13/00* (2006.01)
  *G02B 23/00* (2006.01)
(52) U.S. Cl. .................. 359/637; 359/431; 359/708; 396/114
(58) Field of Classification Search ................ 359/399, 359/637, 625–626, 362–363, 422–432, 708–712; 396/354, 358, 114, 447, 373–386
See application file for complete search history.

(56) References Cited

U.S. PATENT DOCUMENTS

| 4,682,237 | A | * | 7/1987 | Kato et al. | 348/341 |
| 4,757,387 | A | * | 7/1988 | Saito | 348/342 |
| 5,457,511 | A | * | 10/1995 | Kanai et al. | 396/355 |
| 5,513,041 | A | * | 4/1996 | Togino | 359/631 |
| 6,643,460 | B1 | * | 11/2003 | Uchiyama et al. | 396/114 |
| 6,822,802 | B1 | * | 11/2004 | Nakano et al. | 359/637 |

\* cited by examiner

*Primary Examiner*—Thong Q Nguyen
(74) *Attorney, Agent, or Firm*—Adams & Wilks (57) ABSTRACT

A terrestrial telescope with digital camera has an imaging optical system having a group of objective lenses and an imaging element disposed at a position at which an optical image is formed by the group of objective lenses. An observation optical system is provided for observing the optical image transmitted by the group of objective lenses. An optical element is inserted into the optical axis so as to be retractable from the optical axis during imaging. The optical element has a transmission surface having a single-eccentric toroidal configuration with different curvatures in vertical and horizontal planes of the optical element for correcting the position on the imaging element at which the optical image is formed so that the position on the imaging element at which the optical image is formed remains substantially unchanged regardless of whether the optical element is inserted into or retracted from the optical axis of the group of objective lenses.

9 Claims, 5 Drawing Sheets

PRIOR ART

FIG. 5

VERTICAL PLANE

HORIZONTAL PLANE

TERRESTRIAL TELESCOPE WITH DIGITAL CAMERA

BACKGROUND OF THE INVENTION

1. Field of the Invention

The present invention relates to a terrestrial telescope with a digital camera that uses a quick-return half-mirror to split the optical path so that the optical path goes to the image pickup device and the observation optical system.

2. Description of the Prior Art

Terrestrial telescopes having a magnification factor ranging from about 20 to 60 are used extensively for observing wild birds and other fauna. Terrestrial telescopes include those based on a Galilean telescope configuration comprising a positive (convex) lens and a negative (concave) lens that functions as an erecting system, and those based on a Keplerian telescope configuration comprising just a positive (convex) lens, to which are added prisms or other such elements to constitute an erecting system. Telescopes thus configured enable a user to observe an erect image.

As well as being able to use such telescopes to observe natural flora and fauna, users want to be able to record the images they are seeing. The prior art includes a configuration comprising a terrestrial telescope to which an imaging mechanism is added to constitute a terrestrial telescope having a digital camera.

Except for the structure of the observation optical system, the structure of the main optical system of the terrestrial telescope with the digital camera is similar to that of a single lens reflex camera. That is, a quick-return (hereinafter "QR") mirror is inserted into the optical path of the main optical system (which functions as the observation optical system) to guide the image to the observation optical system.

The QR mirror can be a total-reflection type mirror. However, a QR half-mirror is used in the case of a digital imaging system. A spatial image formed by light reflected by the QR half-mirror and passed through an erecting optical system can be viewed by a user via the ocular lens of the observation optical system. In addition, light transmitted by the QR half-mirror falls incident on the image pickup device. By retracting the QR half-mirror from the main optical axis during imaging, the total amount of the light that has been split can be made to fall incident on the image pickup device. The advantage of this configuration is that during the observation period, autofocus control and exposure control can be carried out based on image signals acquired by the image pickup device via the half-mirror.

However, if the QR half-mirror is a parallel plane glass plate, there is a problem of deviation along the optical axis between the position at which an image is formed by light from the optical system transmitted by the QR half-mirror and the position at which the image is formed when the QR half-mirror is retracted from the optical axis. Moreover, shifting of the optical axis also results in a discrepancy between the images obtained by the image pickup device during observation and during imaging, producing differences between the image during autofocus processing and the image that is actually taken. This causes the imaging to be carried out with a focus position and field of view that are different from those the user intended to use. Astigmatism of the image transmitted by the half-mirror disposed at an angle of 45 degrees further arises from the difference in the length of the optical paths in the vertical and horizontal planes. This degrades the sharpness of the image, which has an adverse affect on the autofocus processing.

In JP2002-340426 A1, the present applicant proposed a configuration to correct the axial deviation in image position by inserting a parallel plane glass plate perpendicular to the optical axis, and in JP2003-12953 A1 proposed a configuration in which a parallel plane glass plate is inserted into the optical axis to correct the shift in the image position.

However, these prior-art configurations increase the number of optical components and require a mechanism for retractably inserting the correctional parallel plane glass plate in addition to the QR half-mirror, increasing the complexity of the mechanism and the cost. Also, since the parallel plane glass plate is inserted during the imaging, the amount of light incident on the image pickup device is decreased, resulting in a photographic image that is dark compared to the original optical performance.

An object of the present invention is therefore to provide a terrestrial telescope with a digital camera that uses a simple configuration that enables the image-formation errors caused by the QR half-mirror to be corrected without the insertion of correctional optical components.

SUMMARY OF THE INVENTION

To attain the above object, the present invention provides a terrestrial telescope with a digital camera that comprises an objective lens group, a quick-return half-mirror disposed at a rear side of the objective lens group that can be retractably inserted into an optical axis of the objective lens group, an image pickup device disposed at a rear side of the quick-return half-mirror, and an observation optical system for observing an image reflected by the quick-return half-mirror, wherein a transmission surface of the quick-return half-mirror is formed as a correctional surface that corrects a position on the image pickup device at which an image is formed such that the position remains substantially unchanged regardless of whether the quick-return half-mirror is inserted or retracted.

Further features of the invention, its nature and various advantages will be more apparent from the accompanying drawings and following detailed description of the invention.

DETAILED DESCRIPTION OF THE PREFERRED EMBODIMENTS

The embodiments of the invention will now be described with reference to the drawings.

In the embodiments described below, the transmission surface of the quick-return half-mirror, as an optical element, for transmitting light to the image pickup device during observation is constructed as a correctional surface that corrects an image-formation position so that it is substantially the same when the quick-return half-mirror is inserted and when it is retracted. For this, the correctional surface of the quick-return half-mirror is formed with a given curvature.

Figure 1:
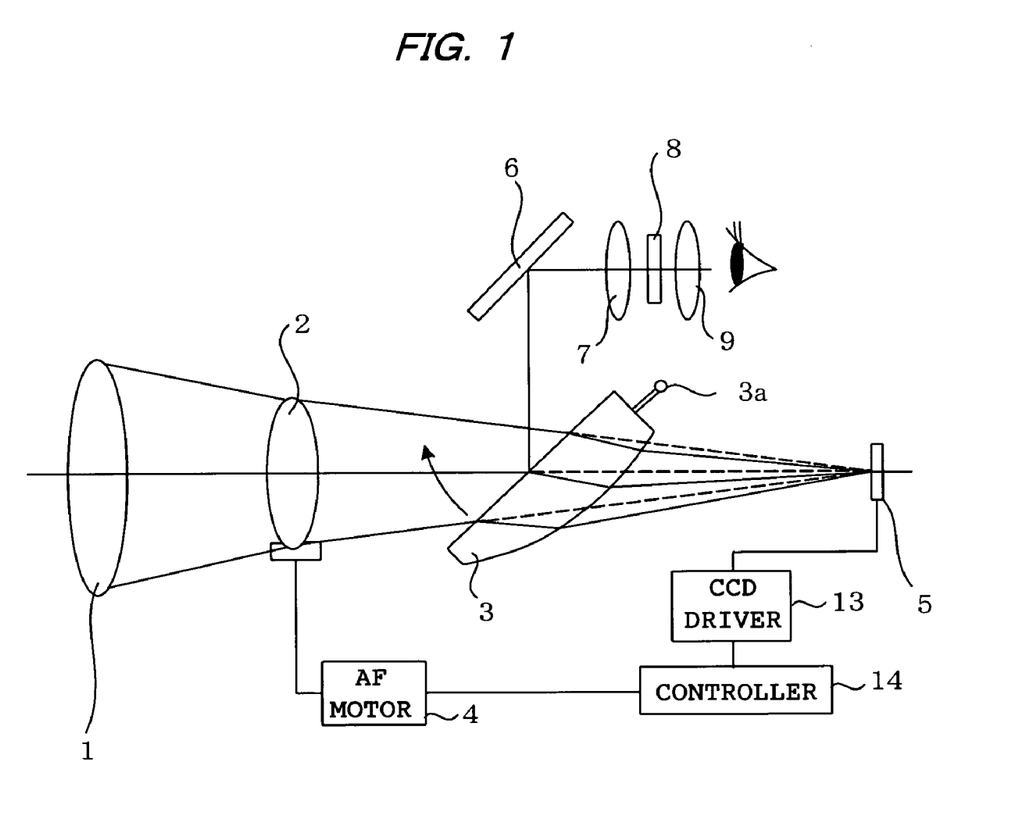
FIG. 1 is a view illustrating the terrestrial telescope with a digital camera according to the present invention, showing the optical system of the telescope in vertical section together with the control system.
Figure 2:
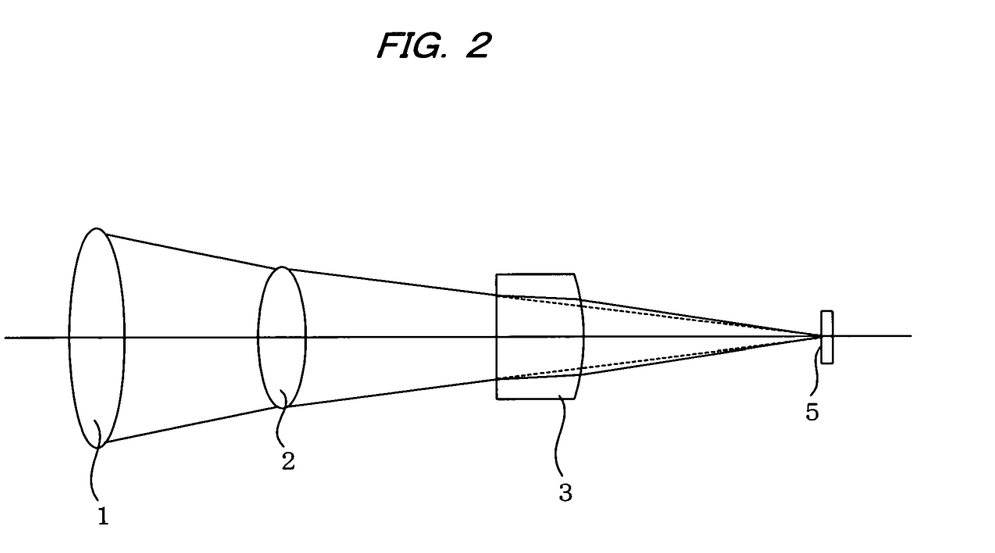
FIG. 2 is a view illustrating the optical system of the telescope of FIG. 1 in horizontal section.

FIG. 1 is a side view of the optical system and control system of the terrestrial telescope with a digital camera of this invention, and FIG. 2 is a top view of the configuration shown in FIG. 1. FIG. 1 shows a vertical cross-section that contains the optical axis of the optical system, and FIG. 2 shows a horizontal cross-section that contains the optical axis of the optical system.

In FIGS. 1 and 2, a light beam transmitted by a group of objective lenses comprised of a fixed lens group 1 and a movable focusing lens group 2 falls incident on a quick-return half-mirror (abbreviated to "QR half-mirror" hereinbelow) 3 that normally intersects the main optical axis (the optical axis of the objective lens group) at an angle of 45 degrees. The movable focusing lens group 2 can be moved along the main optical axis by an AF (auto-focus) motor 4.

Unlike in the prior art in which the half-mirror is a parallel plane glass plate, the QR half-mirror 3 has the shape shown in the FIGS. 1 and 2. Before describing details of the shape of the half-mirror 3, the basic configuration of the optical system will be described.

An imaging optical system disposed along the main optical axis includes the group of objective lenses and an imaging element. The light transmitted by the QR half-mirror 3 falls incident on an image pickup device 5 (such as a CCD or CMOS) as the imaging element located on the focal plane. The light reflected by the QR half-mirror 3 falls incident on the observation optical system and, via an erecting optical system composed of a combination of a penta roof prism (not shown) or a reflecting mirror 6 and a relay lens 7, forms a spatial image on a reticle 8 located at a position conjugate to the position of the focal plane. Via an ocular lens 9, the user can view the image as an erect image. The reflectance of the QR half-mirror 3 is arbitrary. However, a reflectance is selected to be 80% to 90% to facilitate observation so that most of the light goes to the observation optical system.

The QR half-mirror 3 is located at the position at which the image is viewed via the ocular lens 9. The QR half-mirror 3 is rotatably supported so that it can pivot about axis 3a. When a shutter release button (not shown) or the like is operated to take an image, a quick-return mechanism (not shown) swings the QR half-mirror 3 up in the direction indicated by the arrow, retracting the QR half-mirror 3 from the main optical system. With the QR half-mirror 3 thus retracted, all the light from the objective optical system impinges on the image pickup device 5.

The image pickup device 5 is driven by a CCD driver 13, via which the image output of the image pickup device 5 is input to a control circuit 14 composed of a microprocessor, memory and other such components.

Image data received from the image pickup device 5 during the imaging is stored on a memory card or other such recording medium (not shown) by the control circuit 14. In this embodiment, during observation the light from the object is also able to enter the image pickup device 5 via the QR half-mirror 3. Therefore, based on the image information thus obtained from the image pickup device 5, it can be processed for showing on a monitor (not shown), processed for autofocusing by using the AF motor 4 to control the movable focusing lens group 2, for exposure calculations (controlling the amount of exposure when the shutter release button is half-pressed), and for carrying out other such processing.

The configuration of the QR half-mirror 3 will now be explained.

The objective lens side of the QR half-mirror 3 is a plane constituting a semi-transmitting surface, and the image pickup device side has a three-dimensional (aspherically curved) shape as shown in FIGS. 1 and 2. The QR half-mirror 3 is given this shape so that, when it is in the inserted position, it corrects deviation in the image-formation positions along the optical axis and perpendicular to the optical axis (image shift).

Figure 3:
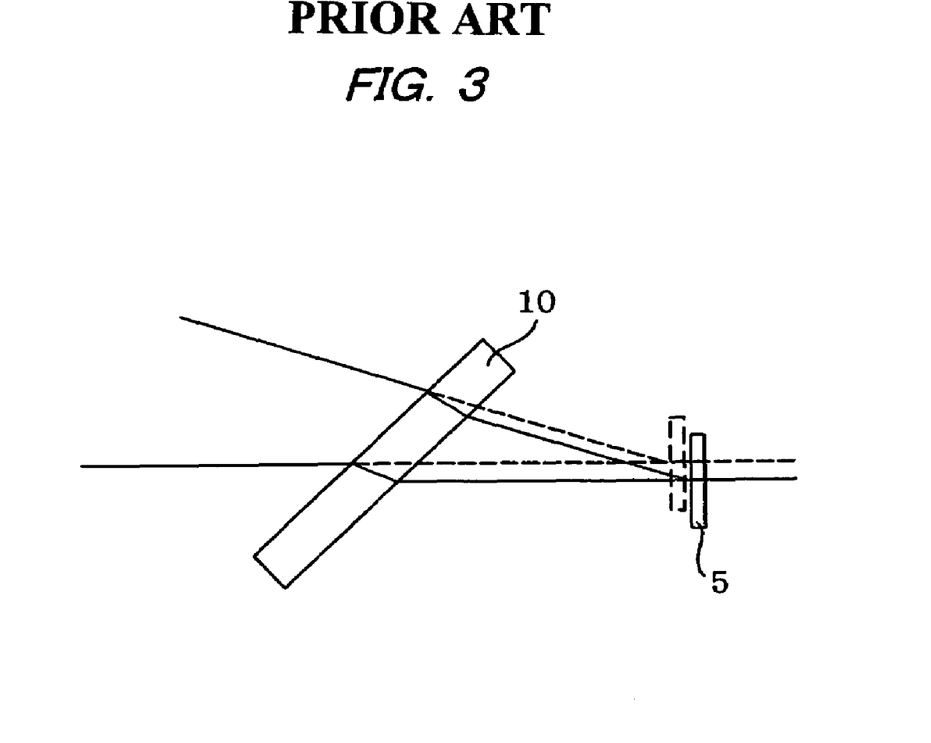
FIG. 3 is a view illustrating a parallel plane glass QR half-mirror in vertical section in a prior art arrangement.
Figure 4:
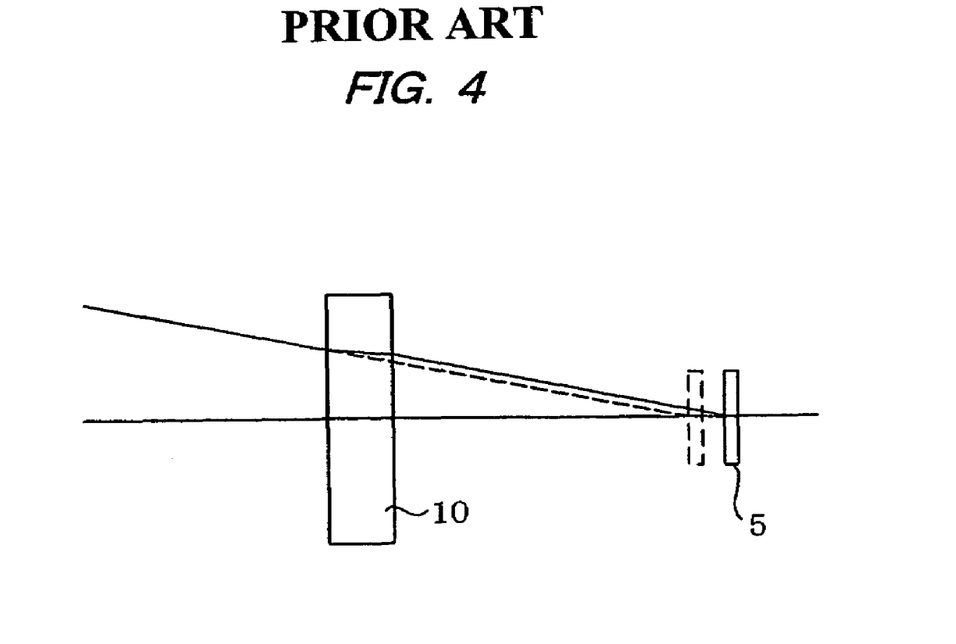
FIG. 4 is a view illustrating a parallel plane glass QR half-mirror in horizontal section in a prior art arrangement.

To consider what kind of correction should be effected by the QR half-mirror 3, FIGS. 3 and 4 show the deviation that arises when the QR half-mirror is a parallel plane type as used in the prior art. FIG. 3 is a sectional view that cuts through the vertical plane of a conventional parallel plane glass QR half-mirror 10 disposed in the optical system, and FIG. 4 is a sectional view that cuts through the horizontal plane of the QR half-mirror 10.

When the QR half-mirror 10 composed of parallel plane surfaces as shown in FIG. 4 (and FIG. 3) is inserted, the image-formation position undergoes a shift to the rear along the optical axis, as indicated by a solid line, compared to the image-formation position when the QR half-mirror 10 is not inserted as indicated by a broken line. Moreover, as the QR half-mirror 10 is inclined with respect to the optical axis, the image-formation position also undergoes a shift downward from the optical axis by insertion of the QR half-mirror 10 compared to when the QR half-mirror 10 is retracted, again indicated in FIG. 3 by the solid line and broken lines, respectively.

Thus, although the image pickup device 5 has to be located in the position shown by a solid line in FIGS. 3 and 4, the image-formation position undergoes a shift or deviation to the position shown by the broken line when the QR half-mirror 10 is retracted. This discrepancy between the positions shown by the solid and broken lines gives rise to autofocus control error and image deviation.

In the case of the invention, the image pickup device side of the QR half-mirror 3 is provided with a curvature, as shown in FIGS. 1 and 2, such that the image of the object is formed at the image pickup surface of the image pickup device 5 regardless of whether the QR half-mirror 3 is inserted or not. That is, in shape, the transmission surface of the QR half-mirror 3 is a single-eccentric eccentric toroid that is curved with a given curvature in the horizontal plane and eccentrically curved in the vertical plane with a different curvature.

Figure 5:
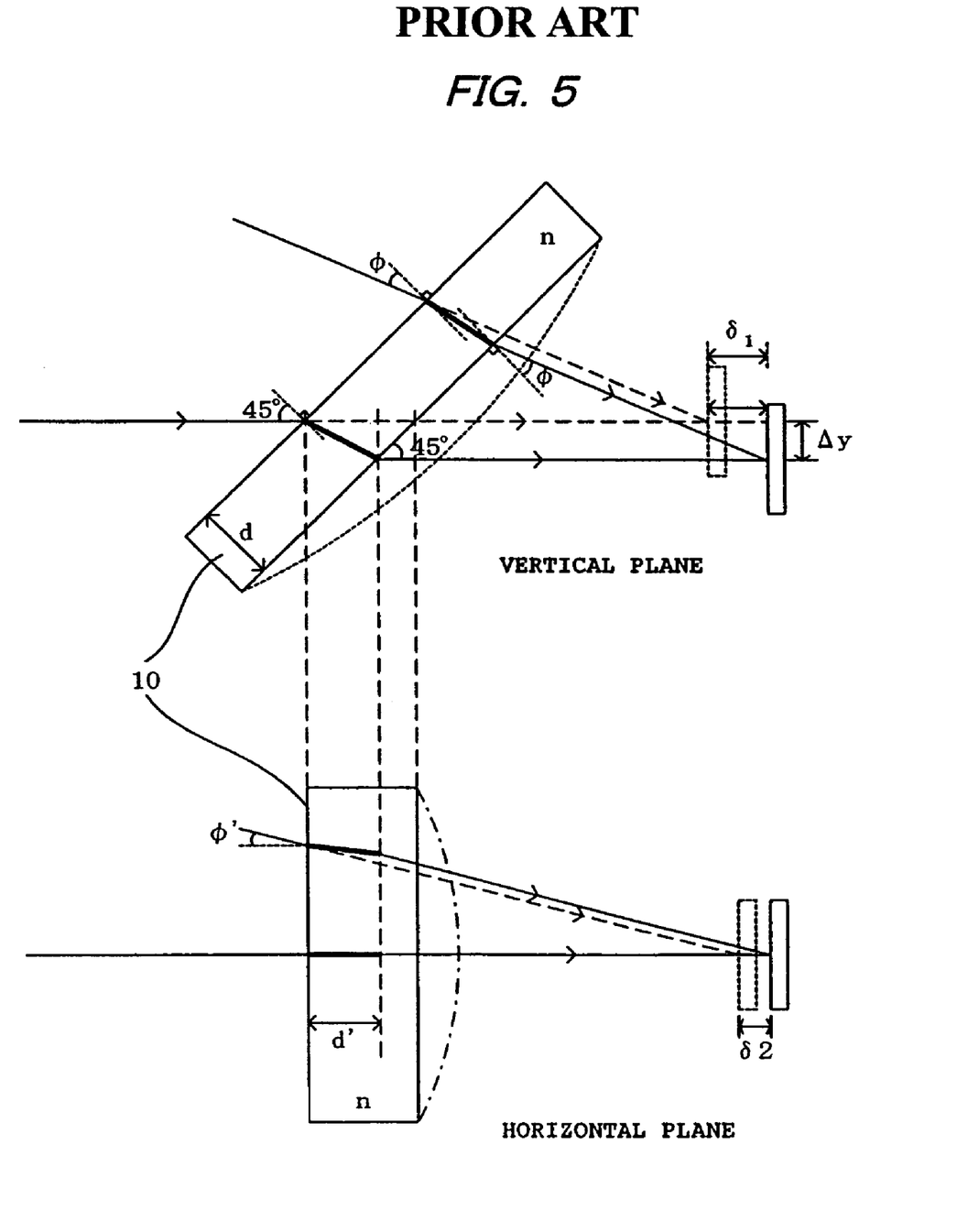
FIG. 5 is a view illustrating astigmatism produced in the case of a parallel plane glass QR half-mirror arrangement according to the prior art.

An image transmitted by a QR half-mirror inserted at an angle to the optical axis is intended for use in AF control or the like in the invention. Therefore, the image-formation deviations as follows should be taken into consideration: (1) deviation along the optical axis, (2) astigmatism produced by the insertion of the QR half-mirror at an angle, and (3) deviation (image shift) in a direction that intersects (is perpendicular to) the optical axis. (1) and (3) are as have been described with reference to FIGS. 3 and 4. The astigmatism of (2) is illustrated in FIG. 5. The explanation will be made according to FIG. 5 with respect to astigmatism caused when the QR half-mirror is inserted at an angle to the optical axis.

In FIG. 5, a difference between the lengths of the optical paths through the half-mirror (indicated by the thick lines) produces focal positional deviation in the vertical and horizontal planes when the parallel plane glass half-mirror 10 is inserted at an angle of 45 degrees to the optical axis. The deviation δ1 in the image-formation position along the optical axis in the vertical plane caused by the insertion of the QR half-mirror 10 can be expressed using Equation (1), taking into account the geometrical relationship of movement of the image-formation position along the optical axis by the central and peripheral beams. Here, the glass (or other suitable material) of the QR half-mirror 10 is assumed to have a refractive index of n, the angle of incidence of the central beam on the QR half-mirror 10 is assumed to be 45 degrees, and the angle of incidence of the peripheral beam on the QR half-mirror 10 is assumed to be φ.

$$\delta_1 = \frac{d}{\cos\phi - \sin\phi} \left\{ \frac{\sqrt{2n^2 - 1} - 1}{\sqrt{4n^2 - 2}} (\cos\phi + \sin\phi) - \sqrt{2} \left( \sin\phi - \frac{\cos\phi \sin\phi}{\sqrt{n^2 - \sin^2\phi}} \right) \right\} \quad (1)$$

The deviation δ2 in the image-formation position along the optical axis in the horizontal plane can be approximated using Equation (2) from the thickness d' and the refractive index n of the QR half-mirror 10.

$$\delta_2 = d'\left(1 - \frac{1}{n}\right) \quad (2)$$

The term relating to the angle of incidence φ' of the peripheral beam is negligibly small, and the image deviation δ2 depends mainly on the thickness d' and refractive index n. It is to be noted that, when the correction amounts δ1 and δ2 are calculated to correct the image-formation positions described below, the beam in the paraxial region is used as a peripheral beam shown in FIG. 5 having an angle of incidence that is very close to 45 degrees (especially in Equation (1)). So in the case of QR half-mirror 10 having a thickness of 1 mm and a refractive index of 1.51633, for example, the focal deviation δ1 along the optical axis would be about 0.60 mm in the vertical plane and the focal deviation δ2 along the optical axis would be about 0.37 mm in the horizontal plane.

According to the definition, the astigmatism produced by the vertical and horizontal focal discrepancies is represented as 0.60−0.38=0.22 (mm). That is, the astigmatism is caused by the image-formation positional deviations (the above (1)) along the optical axis in the vertical and horizontal planes when the half-mirror is inserted at an angle to the optical axis. If this astigmatism is left uncorrected, it has an adverse effect on the image sharpness and on the AF control and the like.

As described above, the insertion of the QR half-mirror 10 at an angle of 45 degrees, as shown in the vertical plane of FIG. 5, also causes the optical axis to be shifted by Δy (image shifted) in the perpendicular direction.

In this embodiment, as shown in FIG. 1, the transmission surface of the QR half-mirror 3 is formed as a correctional surface that performs image-formation positional correction so that the image-formation position relative to the image pickup device 5 when the QR half-mirror 3 is inserted is substantially the same as that when the QR half-mirror 3 is retracted. This correctional surface is formed as a special curved surface that (1') corrects the image-formation positional deviations along the optical axis that differ in the vertical and horizontal planes, (2') corrects astigmatism at the same by means of (1'), and (3') corrects an image shift (shift of the imaging optical axis) in a direction that intersects (is perpendicular to) the optical axis by making the curved surface eccentric.

For (1'), a toroidal surface is used having different curvatures in the vertical and horizontal planes of the QR half-mirror 3. And for (3'), the principal point of the curved surface is decentered (translated in parallel) within the vertical plane.

The working principle of the decentered toroidal surface will now be described.

Figure 6:
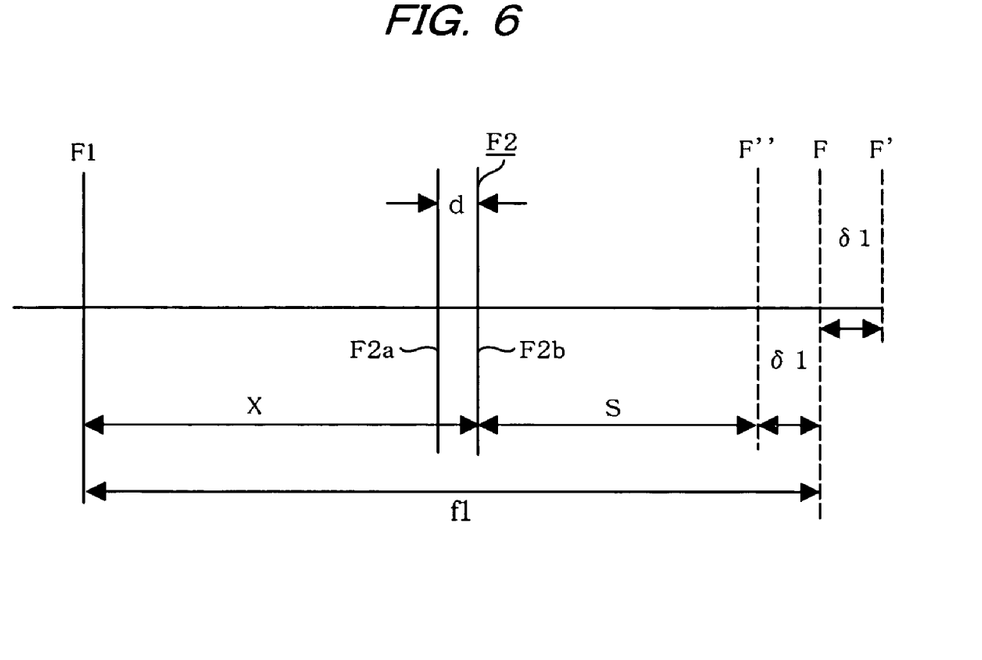
FIG. 6 is a view illustrating the correction of deviation of an image-formation position in the QR half-mirror of the telescope of FIG. 1.

FIG. 6 depicts a typical optical system of the embodiment, showing only the positions of the optical components. In FIG. 6, F2 denotes a QR half-mirror (QR half-mirror 3 of FIG. 1) and F1 denotes the imaging optical system up to the front of the QR half-mirror F2 (the objective lens group of FIG. 1). The QR half-mirror F2 has a semi-transmitting (reflecting) surface F2a on the optical system F1 side and a transmission surface F2b on the opposite side, and has a thickness d (not fixed). In FIG. 6, these surfaces are shown only as straight lines perpendicular to the optical axis.

F denotes the image-formation position of the optical system at which the image pickup device 5 is located. Position F is a position with the QR half-mirror F2 in the retracted state. f1 denotes the overall focal length of the optical system (F1 to F). F' is the position at which the image is formed when a conventional parallel plane half-mirror is in the inserted state, producing a focal deviation of δ1 to the rear of the image-formation position F, as shown in FIG. 5 and elsewhere. This deviation δ1 is proportional to the thickness d of the QR half-mirror F2. In this embodiment, the transmission surface F2b is a toroidal surface with different curvatures in the vertical and horizontal planes to individually correct the optical axial deviations δ1 and δ2 shown in FIG. 5.

The effects of the curvatures of the transmission surface F2b in the vertical and horizontal planes will now be explained.

First, the required refractive power of the curved surface in the vertical plane will be considered. The transmission surface F2b of the QR half-mirror F2 in the vertical plane is given a curvature. The image-formation position F" obtained when the thin lens constituted by the transmission surface F2b of the QR half-mirror F2 is inserted is away from the principal point of the thin lens by a distance S. The refractive power of the thin lens can be expressed as 1/f2, where f2 is the focal length of the QR half-mirror F2.

If X is the distance from the principal point of the optical system F1 to the principal point of the thin lens constituted by the transmission surface F2b, the above distance S will remain the same even if the QR half-mirror F2 is inserted at an angle of 45 degrees, as shown in FIG. 1. This is because the curve forming the transmission surface F2b in the vertical plane is an arc. The distance S can be shown by the following equation.

$$S = f_2 \frac{(f_1 - X)}{(f_1 + f_2 - X)} \quad (3)$$

In practice, the focal deviation δ1 is produced by the thickness d of the QR half-mirror F2. The distance S, therefore, has to satisfy the following condition so that the final image-formation position is the same F as that when the QR half-mirror F2 is retracted.

$$S = f_1 - X - \delta_1 \quad (4)$$

It is to be noted that, in Equation (4), the deviation δ1 produced by the thickness d of the QR half-mirror F2 can be calculated using Equation (1) with the thickness d whose value corresponds to that in the vicinity of the optical axis.

Therefore, from the Equations (3) and (4) the focal length of the thin lens constituted by the transmission surface F2b in the vertical plane can be obtained as follows.

$$f_2 = \frac{(f_1 - X)^2}{\delta_1} - f_1 + X \quad (5)$$

For example, when f1 =100 mm, X =70 mm and d =1 mm, δ1 =0.603511952 mm and f2 will be 1461 mm.

This focal length f2 and the refractive index of the material of the QR half-mirror F2 can be used to calculate the required curvature of the transmission surface F2b in the vertical plane. Providing the transmission surface F2b in the vertical plane with a curvature that satisfies Equation (5) results in zero focal deviation in the vertical plane, making it possible to locate the image-formation position at F when the QR half-mirror F2 is in the inserted state or in the retracted state.

The required curvature of the transmission surface F2b in the horizontal plane is calculated in the same way. That is, the horizontal-plane focal deviation δ2 to be corrected is substituted for δ1 in Equation (5), which allows the focal length f2' of the curved surface in the horizontal plane constituted by the transmission surface F2b to be obtained as follows.

$$f_2' = \frac{(f_1 - X)^2}{\delta_2} - f_1 + X \quad (6)$$

For example, when f1 =100 mm, X =70 mm and d =1 mm, δ2=0.36770691 mm and f2' will be 2418 mm.

In this way, the curved transmission surface F2b of the QR half-mirror F2 is formed as a toroid (donut shape) in which the surface has curvatures having different refractive powers of 1/f2 and 1/f2' in the vertical and horizontal planes, respectively. Using this toroidal shape makes it possible to provide the different curvatures required in the vertical and horizontal planes.

Of the problems described above, (1) image-formation positional deviations along the optical axis, which differ in the vertical and horizontal planes, can be corrected, and at the same time, (2) astigmatism caused by differences in focal deviations in the vertical and horizontal planes can be eliminated.

Figure 7:
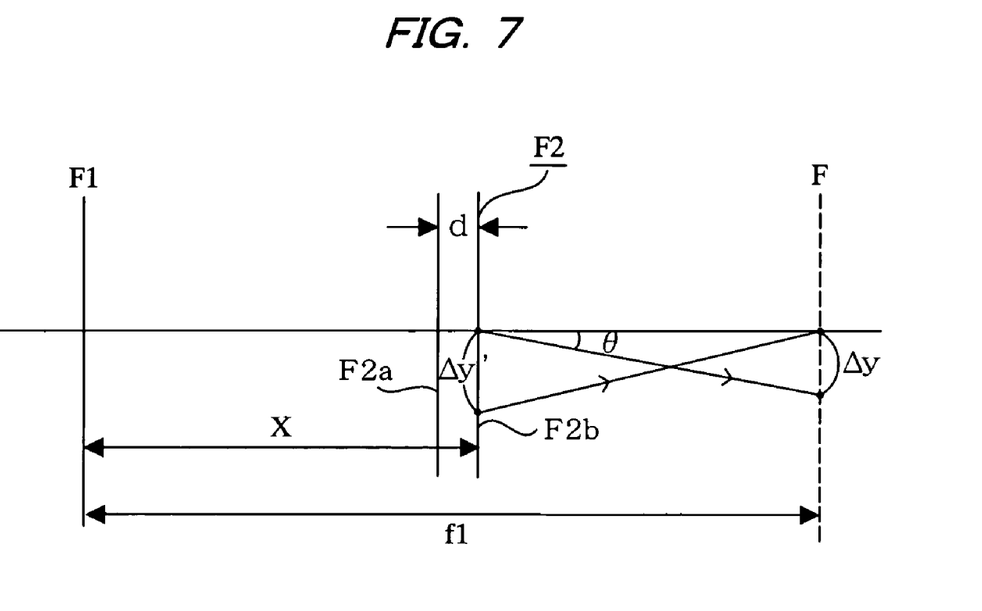
FIG. 7 is a view illustrating the correction of imaging optical axis shift in the QR half-mirror of the telescope of FIG. 1.

In addition, (3) the shift of the imaging optical axis (image shift) in a direction that intersects (is perpendicular to) the optical axis can be corrected by making the curved transmission surface F2b of the QR half-mirror F2 eccentric to translate the center of the QR half-mirror F2 through which the optical axis elongates. That is, as shown in FIG. 7, the optical axis deviation Δy can be cancelled by vertically offsetting the principal point of the curved transmission surface F2b by the amount Δy'. This shift Δy of the optical axis is the same as the Δy of FIG. 5, and in accordance with Snell's law, can be calculated based on the curvature and thickness d of the QR half-mirror F2, again using a value in the vicinity of the optical axis for the thickness d.

In FIG. 7, the angle of the optical axis that produces the optical axis shift Δy is θ, so that the amount of eccentricity Δy' of the curve imparted to the transmission surface F2b can be obtained as follows.

$$\Delta y' = f_2 \tan\theta = \frac{f_2 \Delta y}{(f_1 - X)} \quad (7)$$

For example, when f1=100 mm, X=70 mm and d=1 mm, Δy is calculated to be 0.33 mm for f2=1461 mm, and Δy' is found to be 16.3 mm. Therefore, the vertical image shift can be cancelled out by vertically offsetting the principal point of the curved transmission surface F2b by 16.3 mm downwards relative to the optical axis.

As mentioned above, the transmission surface F2b is curved into a shape that, (1') corrects image-formation positional deviations along the optical axis in the vertical and horizontal planes, (2') corrects astigmatism at the same by means of (1'), and (3') corrects the optical axis shift (image shift) in a direction that intersects (is perpendicular to) the optical axis. This allows the corrections of (1) image-formation positional deviation along the optical axis, (2) astigmatism produced by the insertion of the QR half-mirror at an angle, and (3) shift of the optical axis (image shift) in a direction that intersects (is perpendicular to) the optical axis. Thus, even when the QR half-mirror is inserted, the image pickup device 5 can capture an image in the same way as when the QR half-mirror is retracted, eliminating the problem of the imaging being carried out with a focus position and field of view different from those the user intended. The arrangement also eliminates the adverse effects on the autofocus processing.

Next, the operation of the terrestrial telescope with digital camera thus configured will be described.

In an observation mode, the shutter release button (not shown) is half-pressed with the QR half-mirror 3 in the position shown in FIG. 1 under the control of the control circuit 14. Light from the object then enters the image pickup device 5 via the QR half-mirror 3 for photoelectric conversion to detect the brightness of the light and the contrast using a conventional contrast detection method.

Based on the detected brightness of the object, the control circuit 14 sets the speed of the electronic shutter of the image pickup device 5 and, based on the detected contrast, operates the AF motor 4 to control the autofocusing by moving the movable focusing lens group 2 along the optical axis. The control circuit 14 drives the AF motor 4 to move the movable focusing lens group 2 to the focus position in accordance with changes in the object contrast so that the contrast of the image of the object formed on the image pickup device 5 is made maximum. Instead, a configuration can be used in which autofocusing control is always carried out rather than being triggered by half-pressing the release button.

Following this, the imaging timing is decided by fully depressing the release button under the control of the control circuit 14. The controller 14 then operates a quick-return mechanism (not shown) to retract the QR half-mirror 3 from the main optical system in the direction indicated by the arrow. Then, the electronic shutter is opened for the set time to image the object. The electronic image data thus obtained can be stored in a storage medium such as a memory card or the like, and transmitted out over a network or the like. After imaging has been completed, the control circuit 14 uses the quick-return mechanism to return the QR half-mirror 3 to the observation position of FIG. 1.

In carrying out the above observation and imaging operations, the transmission surface of the QR half-mirror 3 used to split the optical path in the terrestrial telescope with digital camera according to this invention has a single-eccentric toroidal configuration having a given curvature in the horizontal plane and an eccentric different curvature in the vertical plane, thereby making it possible to correct the imaging optical axis shift in a direction that intersects (is perpendicular to) the optical axis as well as image-formation positional deviations along the optical axis.

Since in accordance with this invention the image-formation position remains the same regardless of whether the QR half-mirror 3 is inserted into the optical path during observation or retracted from the optical path during imaging, it is possible to substantially eliminate autofocusing control error and image deviation during observation and imaging. Moreover, this is done using just the QR half-mirror 3, unlike in the prior art arrangements in which it was necessary to provide a correctional glass plate and a mechanism for inserting and retracting the plate, so the present invention has the merit of having a simple structure. Furthermore, since there is also no loss of light intensity caused by the use of a correctional glass plate, there is no degradation in the performance of the optical system, making it possible to obtain high-quality images.

Thus, this invention makes it possible to correct the image-formation position of the QR half-mirror using a very straightforward arrangement that does not require additional correctional optical components. The invention is therefore highly effective with respect to obtaining high-quality images because the sharpness of the images is not degraded by autofocusing control error and image deviation.

To facilitate the above explanation, the QR half-mirror 3 was described as being inserted into the main optical system at an angle of 45 degrees. However, it is to be understood that the invention is not limited to this, but that the angles at which the QR half-mirror 3 is disposed relative to the main optical system, as well as other design conditions, can be suitably modified as required.

As described in the foregoing, the terrestrial telescope with a digital camera according to this invention comprises an objective lens group, a quick-return half-mirror disposed at a rear side of the objective lens group that can be retractably inserted into an optical axis of the objective lens group, an image pickup device disposed at a rear side of the quick-return half-mirror, and an observation optical system for observing an image reflected by the quick-return half-mirror. In the invention, a transmission surface of the quick-return half-mirror is formed as a correctional surface having a toroidal shape that corrects image-formation positional deviations caused by insertion or retraction of the quick-return half-mirror. This makes it possible to correct the image-formation positional deviations caused by the QR half-mirror using a very simple arrangement that does not require additional correctional optical components. The invention is therefore highly effective with respect to obtaining high-quality images because the images are not degraded by autofocusing control error and image deviation.

What is claimed is:

1. A terrestrial telescope with a digital camera comprising:
a group of objective lenses having an optical axis;
an image pickup device disposed along the optical axis of the group of objective lenses at a position at which an image is formed by the group of objective lenses;
a quick-return half-mirror inserted into the optical axis and at a rear side of the group of objective lenses so as to be retractable from the optical axis during imaging; and
an observation optical system for observing an optical image reflected by the quick-return half-mirror;
wherein the quick-return half-mirror has a transmission surface having a single-eccentric toroidal configuration with different curvatures in vertical and horizontal planes of the quick-return half-mirror for correcting the position on the image pickup device at which the image is formed so that the position on the image pickup device at which the image is formed remains substantially unchanged regardless of whether the quick-return half-mirror is inserted into or retracted from the optical axis of the group of objective lenses.

2. A terrestrial telescope with a digital camera according to claim 1; wherein the single-eccentric toroidal configuration of the transmission surface of the quick-return half-mirror corrects image-formation positional deviations in the horizontal and vertical planes and astigmatism arising from the image-formation positional deviations in the horizontal and vertical planes.

3. A terrestrial telescope with a digital camera according to claim 1; further comprising means for decentering the transmission surface of the quick-return half-mirror with respect to the optical axis to correct a shift in the optical axis in a direction intersecting the optical axis.

4. A terrestrial telescope with a digital camera comprising:
an imaging optical system having an optical path and including a group of objective lenses and an imaging element disposed along the optical path at a position at which an image of a subject is formed by the group of objective lenses;
an optical element disposed on the optical path of the imaging optical system between the group of objective lenses and the imaging element so as to be retractable from the optical path of the imaging optical system, the optical element having a transmission surface having a single-eccentric toroidal configuration with different curvatures in vertical and horizontal planes of the optical element for correcting the position on the imaging element at which the image of the subject is toned so that the position on the imaging element at which the image of the subject is formed remains substantially unchanged regardless of whether the optical element is disposed on or retracted from the optical path of the imaging optical system; and
an observation optical system for observing an optical image of the subject via the optical element disposed on the optical path of the imaging optical system.

5. A terrestrial telescope with a digital camera according to claim 4; wherein the single-eccentric toroidal configuration of the transmission surface of the optical element corrects image-formation positional deviations in the horizontal and vertical planes and astigmatism arising from the image-formation positional deviations in the horizontal and vertical planes.

6. A terrestrial telescope with a digital camera according to claim 5; wherein the optical element comprises a quick-return half mirror.

7. A terrestrial telescope with a digital camera according to claim 4; further comprising means for decentering the transmission surface of the optical element with respect to the optical path to correct a shift in the optical path in a direction intersecting the optical path.

8. A terrestrial telescope with a digital camera according to claim 7; wherein the optical element comprises a quick-return half-mirror.

9. A terrestrial telescope with a digital camera according to claim 4; wherein the optical element comprises a quick-return half-mirror.

* * * * *